(12) United States Patent
Mahadevan et al.

(10) Patent No.: US 9,929,949 B2
(45) Date of Patent: Mar. 27, 2018

(54) SYSTEMS AND METHODS FOR INFERRING NETWORK TOPOLOGY AND PATH METRICS IN WIDE AREA NETWORKS

(71) Applicant: Google Inc., Mountian View, CA (US)

(72) Inventors: Priya Mahadevan, Sunnyvale, CA (US); Bikash Koley, Sunnyvale, CA (US); Anees Shaikh, San Jose, CA (US)

(73) Assignee: Google LLC, Mountain View, CA (US)

( * ) Notice: Subject to any disclaimer, the term of this patent is extended or adjusted under 35 U.S.C. 154(b) by 213 days.

(21) Appl. No.: 14/753,883

(22) Filed: Jun. 29, 2015

(65) Prior Publication Data
US 2016/0380892 A1    Dec. 29, 2016

(51) Int. Cl.
| | | |
|---|---|---|
| *H04L 12/721* | (2013.01) | |
| *H04L 12/751* | (2013.01) | |
| *H04L 12/24* | (2006.01) | |
| *H04L 12/717* | (2013.01) | |
| *H04L 12/26* | (2006.01) | |

(52) U.S. Cl.
CPC .......... *H04L 45/70* (2013.01); *H04L 41/145* (2013.01); *H04L 45/02* (2013.01); *H04L 45/42* (2013.01); *H04L 41/12* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 7,778,165 | B2 | 8/2010 | Madhyastha et al. |
| 8,204,973 | B2 | 6/2012 | Cuervo et al. |
| 8,472,324 | B1 | 6/2013 | Richardson et al. |
| 8,542,612 | B1 | 9/2013 | Uttaro |
| 8,891,522 | B2 | 11/2014 | Fletcher et al. |

(Continued)

FOREIGN PATENT DOCUMENTS

WO    02089406 A2    11/2002

OTHER PUBLICATIONS

Dugeon, O., et al. Path Computation Element (PCE) Database Requirements draft-dugeon-pce-ted-reqs-03, Path Computation Element Working Group, Internet Engineering Taskforce, Standard Working Draft, Internet Society, Feb. 14, 2014, 18 pages.

(Continued)

*Primary Examiner* — Peter Chau
(74) *Attorney, Agent, or Firm* — McDermott Will & Emery LLP (57) ABSTRACT

Described are methods and system for network analysis. A network analyzer for a first network is configured to receive network assessment information from a network metric monitors situated in third-party networks, the network assessment information indicating values for characteristics of one or more network paths from the respective network metric monitor to a node in a second network. The network analyzer aggregates the received network assessment information and identifies, from the aggregated network assessment information, a route from the first network to the node in the second network. The identified route is then selected from among a plurality of potential routes from the first network to the node in the second network and used in setting a routing policy for data flows from the first network through the node in the second network.

17 Claims, 5 Drawing Sheets

(56) References Cited

U.S. PATENT DOCUMENTS

| | | | |
|---|---|---|---|
| 2002/0141343 A1* | 10/2002 | Bays | H04L 41/0893 370/235 |
| 2002/0141378 A1 | 10/2002 | Bays et al. | |
| 2002/0145981 A1 | 10/2002 | Klinker et al. | |
| 2002/0165957 A1 | 11/2002 | Devoe et al. | |
| 2002/0199016 A1* | 12/2002 | Freedman | H04L 12/2697 709/241 |
| 2003/0204619 A1* | 10/2003 | Bays | H04L 12/2697 709/238 |
| 2007/0171909 A1 | 7/2007 | Pignatelli | |
| 2009/0016236 A1* | 1/2009 | Alcala | H04L 43/022 370/253 |
| 2009/0198832 A1* | 8/2009 | Shah | H04L 41/0668 709/239 |
| 2011/0032833 A1* | 2/2011 | Zhang | H04L 45/70 370/252 |
| 2013/0142203 A1 | 6/2013 | Koponen et al. | |
| 2015/0103662 A1* | 4/2015 | Valero | H04L 47/2441 370/235 |

OTHER PUBLICATIONS

Farrel, Adrian, et al. RFC 4655—A Path Computation Element (PCE)-Based Architecture, Internet Engineering Taskforce, Standard Internet Society—retrieved from http://tools.ietf.org/html/rfc4655 on Dec. 2, 2014 (40 pages).

Farrel, Adrian, et al. The Role of PCE in an SDN world, European Workshop on Software Defined Networks, Sep. 1, 2014, retrieved from http://ewsdn.eu/AdrainFarrel-TheRoleOfPCEInAnSDNWorld.pdf on Dec. 2, 2014 (34 pages).

International Search Report and Written Opinion dated Sep. 9, 2016 in PCT Application No. PCT/US2016/037636.

DiCaro et al., AntNet: A Mobile Agents Approach to Adaptive Routing, IRIDIA, Technical Report IRIDIA/97-12, IRIDIA, Université Libre de Bruxelles, Belgium, 1997.

Han et al., Topology Aware Overlay Networks, INFOCOM 2005. 24th Annual Joint Conference of the IEEE Computer and Communications Societies. vol. 4. IEEE, 2005.

Katz-Basset et al., Reverse Traceroute, USENIX Symposium on Networked Systems Design & Implementation (NSDI), 2010.

Masala et al., Challenges and Issues on Collecting and Analyzing Large Volumes of Network Data Measurements, Sep. 1, 2013.

Pallis et al., A Latency-based Object Placement Approach in Content Distribution Networks, IEEE Web Congress, 2005. LA-WEB 2005. Third Latin American. IEEE, 2005.

Sriram et al., Preferred link based delay-constrained least-cost routing in wide area networks, Computer Communications, 21, 1998.

\* cited by examiner

SYSTEMS AND METHODS FOR INFERRING NETWORK TOPOLOGY AND PATH METRICS IN WIDE AREA NETWORKS

BACKGROUND

Information is transmitted over computer networks. The information is represented as bits divided into packets. The packets are passed from network device to network device, e.g., switches and routers, propagating the information through the computer networks. Each packet is transmitted from its source towards a destination specified by header information in the respective packet. The source and destination of a packet may respectively be in different portions of the network, each portion operated by a different party. There may be multiple possible routes between the source and destination.

A wide area network ("WAN"), such as the Internet, can include multiple sub-networks known as autonomous systems ("AS"). An autonomous system is a portion of the network that appears to other portions of the network as though it has unified administration of a single routing policy and presents, to the other portions of the network, a consistent picture of reachable network destinations, e.g., as network address spaces reachable through the AS. In some instances, an autonomous system can be identified by an autonomous system number ("ASN") that is unique within the network. Typically, an operator of an autonomous system has agreements with third-parties for allowing data to be carried on one or more autonomous systems controlled by the respective third-party, usually under a "settlement" agreement for transit billed by usage or as a "settlement-free" peering agreement. Data may then be transmitted from one autonomous system to another at a peering point, a multi-homed network device, an Internet eXchange Point ("IXP"), or the like, within the confines of the agreements between autonomous system operators. Network devices in the WAN can then communicate across a network route that may span multiple autonomous systems.

SUMMARY

In some aspects, the disclosure relates to a system. The system includes a plurality of network metric monitors configured to obtain measurements for one or more network metrics, and transmit network assessment information based on the obtained measurements to a network analyzer in a first network, the network assessment information indicating values for characteristics of one or more network paths from the respective network metric monitor to a node in a second network. At least one of the plurality of network metric monitors is situated in a network external to the first network. The system includes a network analyzer configured to receive the network assessment information from the plurality of network metric monitors, and aggregate the received network assessment information. The system includes a network controller for the first network, the network controller configured to select, based on the aggregated information, a route from among a plurality of potential routes from the first network to the node in the second network that satisfies a set of criteria; and set routing policy for data flows from the first network through the node in the second network using the selected route.

In some aspects, the disclosure relates to a method. The method includes receiving, by a network analyzer comprising at least one processor in a first network, network assessment information from a plurality of network metric monitors, the network assessment information indicating values for characteristics of one or more network paths from the respective network metric monitor to a node in a second network, wherein at least one network metric monitor is situated in a network external to the first network. The method includes aggregating, by the network analyzer, the received network assessment information. The method includes selecting, based on the aggregated information, a route from among a plurality of potential routes from the first network to the node in the second network that satisfies a set of criteria, and setting a routing policy for data flows from the first network through the node in the second network using the selected route.

In some aspects, the disclosure relates to a non-transitory computer-readable medium storing instructions that, when executed by a computer processor, cause the computer processor to: receive network assessment information from a plurality of network metric monitors, wherein at least one network metric monitor is situated in a network external to a first network, the network assessment information indicating values for characteristics of one or more network paths from the respective network metric monitor to a node in a second network; aggregate the received network assessment information; select, based on the aggregated information, a route from among a plurality of potential routes from the first network to the node in the second network that satisfies a set of criteria; and set a routing policy for data flows from the first network through the node in the second network using the selected route.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

Figure 1:
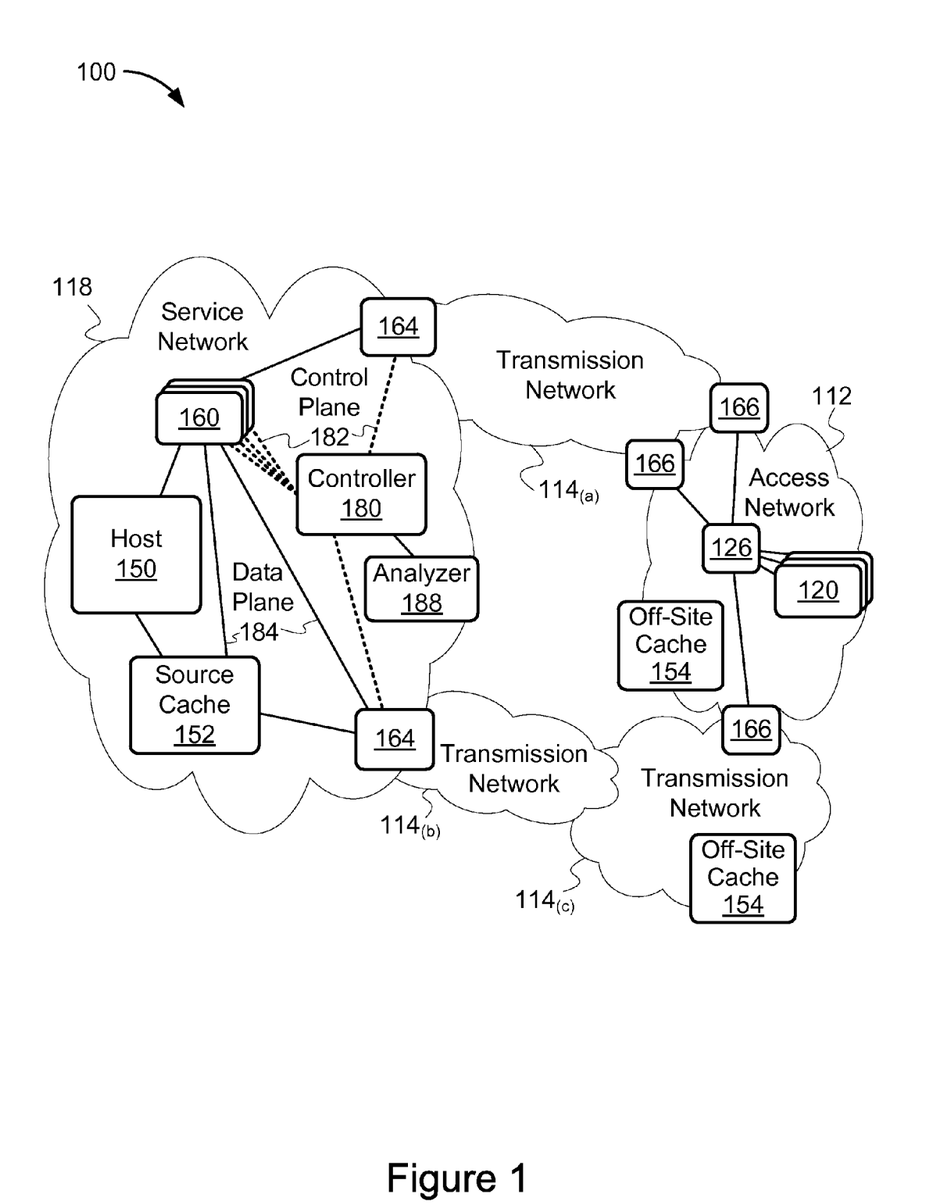
FIG. 1 is a block diagram of an example network environment that includes multiple autonomous systems.

FIG. 1 is a block diagram of an example network environment 100 that includes multiple routing domains or autonomous system ("AS") networks, e.g., the illustrated access network 112, transmission networks 114$_{(a)}$, 114$_{(b)}$, and 114$_{(c)}$ (generically referred to herein as a transmission network 114) and service network 118. While the Internet is a good example of a large network 100, this description is equally applicable to other networks as well.

In broad overview, the illustrated network environment 100 includes a service network 118, which includes a host 150 and additional network devices 160, e.g., switches or routers, controlled by a network controller 180. The illustrated network environment 100 also includes an access network 112. End users of services provided by the host 150 operate end devices 120 that access the network via an access node 126 in the access network 112. One non-limiting example of an access network 112 is an Internet Service Provider ("ISP"). The end devices 120 exchange data with the host 150 via one or more transmission networks 114, which may be any network used to carry data between the service network 118 and the access network 112. For example, the host 150 may transmit a data packet through the additional network devices 160, which route the data packet to an edge node 164 connecting the service network 118 to a transmission network 114 selected according to a routing policy controlled by the controller 180. The selected transmission network 114 forwards the data packet along until it reaches an edge node 166 of the access network 112. In some instances, the service network 118 may have a direct connection to the access network 112 such that no transmission network 114 is used. In some instances, a transmission network 114 may also be an access network for other network devices not shown. Regardless, the access network 112 then forwards the data packet to the access node 126. The access node 126 then forwards the packet to the end device 120.

A network analyzer 188 gathers data descriptive of network performance for each of the participating networks, e.g., the access network 112, the transmission networks 114, and the service network 118. The gathered data is then used to determine values for one or more metrics describing portions of one or more routes between the host 150 and the access node 126 servicing one or more end nodes 120. For example, as illustrated in FIG. 1, there is a first route through transmission network $114_{(a)}$ and a second route through transmission networks $114_{(b)}$ and $114_{(c)}$. The network analyzer 188 gathers data descriptive of these routes. The network analyzer 188 provides analysis to a controller 180 and the controller 180 then uses the determined values for the one or more metrics to select between the possible routes for data exchanges between the host 150 and the end nodes 120. In some implementations, multiple routes are selected, e.g., for load balancing. In some implementations, the controller 180 configures the network devices 160, via a control plane 182, to use the selected route or routes. The host 150 transmits packets to the end devices 120 through the network devices 160 and benefits from the route selected by the network controller 180. In some implementations, as described in more detail below, packets to the end nodes 120 originate at a cache, e.g., a source cache 152 in the service network 118 or an off-site cache 154 situated down-stream in a transmission network 114 (as shown) or even in the access network 112 itself.

Figure 5:
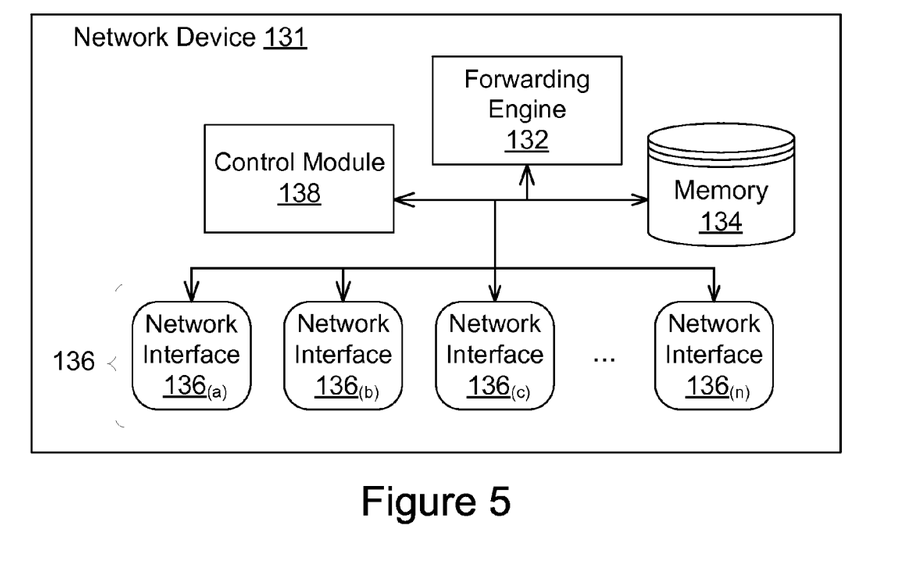
FIG. 5 is a block diagram of a network device suitable for use in the various implementations described.
Figure 6:
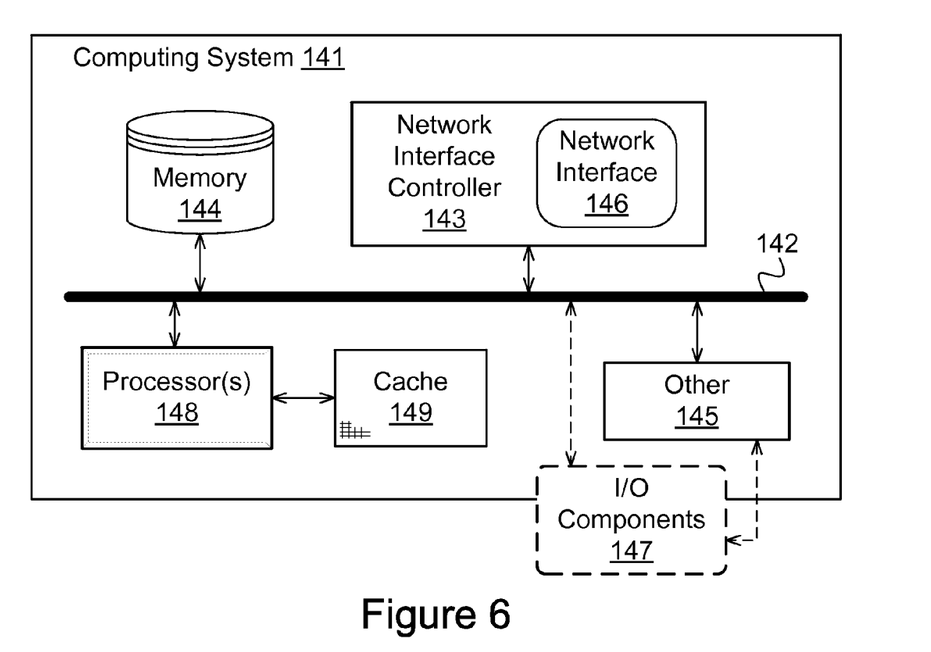
FIG. 6 is a block diagram of a computing system suitable for use in the various implementations described.

FIG. 5, described in detail below, illustrates an example network device 131 suitable for use in the access network 112, transmission networks 114, and service network 118, e.g., as a network device 160, edge device 164 or 166, or an access node 126. FIG. 6, described in detail below, illustrates an example computing system 141 suitable for use as a host 150, controller 180, analyzer 188, end device 120, source cache 152, off-site cache 154, or even as a network device 160, edge device 164 or 166, or an access node 126. In some implementations, one or more of the networks 112, 114, or 118 are implemented using network function virtualization ("NFV"). In an NFV network, some network functionality normally implemented in a network device 160 (or edge device 164 or 166) are implemented as software executing on a processor (e.g., a general purpose processor). In some implementations, this virtualized network functionality includes one or more of load balancing, access control, firewall, intrusion detection, and routing. Other network functionality may also be virtualized in this manner.

Referring to FIG. 1 in more detail, the illustrated network environment 100 enables communication between various network devices, e.g., end devices 120, the host 150, the source cache 152, and the off-site cache 154. The network 100 is logically divided into sub-networks, e.g., autonomous systems 112, 114, and 118, each composed of various network devices linked together to form one or more communication paths between participating devices. For example, network devices 160 are illustrated in the service network 160 with links forming a data plane 184, e.g., connecting network devices 160 to an edge node 164. Each networked device includes at least one network interface for transmitting and receiving data, typically as one or more packets. The network interfaces link the networked devices to each other, forming the network. The network environment 100 may be composed of multiple networks, which may each be any of a local-area network (LAN), such as a company intranet, a metropolitan area network (MAN), a wide area network (WAN), an inter-network such as the Internet, or a peer-to-peer network, e.g., an ad hoc WiFi peer-to-peer network. The data links between devices may be any combination of wired links (e.g., fiber optic, coaxial, Cat-5, Cat-5e, Cat-6, etc.) and/or wireless links (e.g., radio, satellite, or microwave based). The networks 112, 114, and 118 may each be public, private, or a combination of public and private networks. The networks may be any type and/or form of data network and/or communication network.

For the purposes of this description, an end device 120 is any kind of computing device participating in a data exchange with the host 150, or acting as a data sink for the source cache 152 or off-site cache 154, via a network external to the service network 118 (i.e., an access network 112). The end device 120 may be configured for user interaction, e.g., as a user device. The end device 120 may be a networked "Internet of Things" device, such as a thermostat, fire alarm, or sensor array such as a weather station. An end device 120 may be a laptop, desktop, tablet, electronic pad, personal digital assistant, smart phone, video game device, television, television auxiliary box (also known as a "set-top box"), kiosk, portable computer, or any other such device. An end device 120 may be capable of presenting content to a user or facilitating presentation of content to a user. An end device 120 typically runs an operating system that manages execution of software applications on the end device 120. In some implementations, the operating system is provided with the user device 120. Applications execute within a computing context controlled by the operating system, i.e., "on top" of the operating system. Applications may be natively installed with the operating system, or installed later, e.g., by a user. In some implementations, the operating system and/or the applications are embedded, e.g., encoded in read-only memory, within the end device 120.

An access node 126 services one or more end nodes 120 with access to the access network 112. In some instances, the end device 120 is directly connected to the access node 126. In some instances, the end device 120 is connected to the access node 126 through one or more intermediary devices (not shown). For example, the end user may operate a small local area network with a local router or switch connected to the access node 126, and the end device 120 is connected to the access node 126 via the local area network. However, the access node 126 is generally a node through which all traffic to or from the end node 120 must pass. It is also the last, or close to the last, network device controlled by the access network 112 before a packet addressed to the end device 120 reaches its destination. Accordingly, from the perspective of the network controller 180 and analyzer 188, selecting a route to the access node 126 is equivalent to selecting a route to any of the end devices 120 serviced by the access node 126. In some implementations, the network controller 180 and analyzer 188 treat a network node that is further removed from the end devices 120 in the access network 112 as a proxy for the access node 126.

Routes to the access node 126, and thus to the end devices 120, pass through an edge node 166 for the access network 112. A large access network 112 may have any number of edge nodes 166. The edge nodes 166 may be distributed geographically. The access network 112 may have multiple points of contact with the same transmission network 114 at various geographic locations. In some implementations, there may be measurable differences in network performance between routes to an access node 126 through each of the possible edge nodes 166 in the access network 112. For example, the access node 126 may be significantly closer to one edge node 166 than other edge nodes 166, or the path between a particular edge node 166 and the access node 126 may be less congested than other paths. Values for some network performance characteristics may be associated with time of day, e.g., latency may be higher during periods of peak network usage. The network analyzer 188 measures network performance for each of the possible routes through the access network 112. In some implementations, the measurements are associated with a measurement time or measurement time interval.

Routes to the access network 112 may run through one or more intermediary networks, referred to herein as transmission networks 114. A transmission network 114 may be any network used to carry data packets between the service network 118 and the access network 112. A transmission network 114 may be one or more autonomous systems controlled by third-parties different from operators of the service network 118 and/or the access network 112. A transmission network 114 may be a distinct routing domain within an AS, where a routing domain is a portion of the network that presents, to the other portions of the network, a consistent picture of reachable network destinations. Each transmission network 114 may impact network performance quality and introduce additional cost. For example, some networks operate as "transit" networks that charge a fee for carrying third-party data. However, where the service network 118 is big enough to have a choice of transmission network(s) 114 for reaching an access network 112, the controller 180 can direct traffic through the transmission network that best meets requirements for the traffic. For example, some traffic may require lowest cost transmission regardless of network quality, while other traffic may require a network route with high bandwidth regardless of cost. In some implementations, a selected route will pass through multiple transmission networks 114. For example, in FIG. 1, there is at least one route from between the service network 118 and access network 112 that passes through both transmission network $114_{(b)}$ and transmission network $114_{(c)}$. In some implementations, performance quality is measured for each of the transmission networks 114 along a route. In some such implementations, one or more of the precision, frequency, or time intervals used in measurements for one transmission network 114 are different from one or more of the precision, frequency, or time intervals used in measurements for another transmission network 114.

The service network 118 is home to a host 150 that provides a service to the end devices 120. For example, the host 150 may be an e-mail server, a file server, a web-page server, or any other network service host. For simplicity, this disclosure treats the host 150 as part of a content delivery network ("CDN"), however this is not meant to be limiting. As part of a CDN, the host 150 may work with one or more caches distributed throughout the network. For example, a source cache 152 may operate within the service network 150 at a location proximate to a particular edge node 164. Data hosted by the source cache 152 can be transmitted to an access network through the proximate edge node 164 with minimal burden on the service network 118. In some implementations, the host 150 may work with an off-site cache 154 operating in a third-party network, e.g., in a transmission network $114_{(c)}$ or even in the access network 112 itself. In some implementations the source cache 152 and the off-site cache 154 are configured to send measurements of one or more performance metrics to the analyzer 188, e.g., via the network. For example, the off-site cache 154 can measure performance metrics for data communications with the access network 112. Other network services, besides content delivery networks, may use similarly distributed servers.

The source cache 152 and the off-site cache 154 each include data storage, which may each be any device, or collection of devices, suitable for storing computer readable data. Suitable data storage devices include volatile or non-volatile storage, network attached storage, and storage area networks. A data storage device may incorporate one or more mass storage devices, which may be co-located or distributed. Devices suitable for storing data include semiconductor memory devices such as EPROM, EEPROM, SDRAM, and Flash memory devices. Devices suitable for storing data include magnetic disks, e.g., internal hard disks or removable disks, magneto optical disks, and CD ROM, DVD-ROM, and Blu-Ray® disc drives. Data storage devices may be virtualized. Data storage devices may be accessed via an intermediary server and/or via a network. Data storage devices may structure data as a collection of files, data blocks, or chunks. Data storage devices may provide for error recovery using, for example, redundant storage and/or error recovery data (e.g., parity bits). The source cache 152 and the off-site cache 154 may each host a database, e.g., a relational database. In some implementations, data is recorded as entries in one or more database tables in a database stored in data storage. In some such implementations, the data is accessed using a query language such as SQL. The source cache 152 and/or the off-site cache 154 may each host a file storage system. Data may be stored structured as a knowledge base. Data may be stored in an encrypted form. Access to stored data may be restricted by one or more authentication systems.

The network controller 180 determines routes for data passing through the service network 118. In some implementations, the controller 180 creates routing tables and remotely programs network devices 160 to use the routing tables, e.g., via the control plane 182. In some implementations, the controller 180 is a software-defined network ("SDN") controller. In some implementations, routes through third-party networks can be controlled from within the service network 118. In some implementations, the controller 180 only routes packets to an edge node 164 for a "next network" transmission network 114 and relies on the next network to forward packets according to that network's own policies. In some implementations, packets within the service network 118 are encapsulated (e.g., with a multiprotocol label switching ("MPLS") header) and tunneled to an edge node 164 selected by the controller 180. In some such implementations, the encapsulation identifies an egress port of the edge node 164, and the edge node 164 de-encapsulates received packets and transmits them to the next network via the identified egress port.

The network analyzer 188 gathers measurements of network performance metrics. The analyzer 188 uses the gathered measurement data to inform decisions about route selections. In some implementations, the network analyzer 188 is co-located with, or incorporated into, the network controller 180. In some implementations, the network analyzer 188 is one or more independent computing systems in communication with the network controller 180. In some implementations, the network analyzer 188 is a virtualized computing system.

Communication through a network may be measured using one or more metrics. For example, throughput is the amount of information, e.g., number of bits, that is transmitted over a portion of the network in a fixed period of time. Bandwidth is a maximum potential throughput, where the limitation is either physical or artificial (e.g., policy driven). Congestion occurs when network devices attempt to get more throughput than the available bandwidth can accommodate. Goodput is the throughput of information content, exclusive of other traffic such as network configuration data, protocol control information, or repeated transmission of lost packets. Latency is the amount of time that elapses between when a sender transmits a packet and the intended receiver processes the packet, i.e., the delay attributable to transmission. Lag is the result of delay, e.g., the perception of delays from the perspective of a communication participant. For example, lag may occur when latency exceeds some tolerance threshold, e.g., where the delay becomes noticeable to an end-user or fails to meet quality of service ("QoS") requirements for a communication protocol. Although lag may also occur when packets are lost or corrupted in transmission, it is generally treated as synonymous with latency. Latency (and lag) may be measured in terms of a one-way transmission or as a round-trip time for a packet transmission and a subsequent response or acknowledgement. In some instances, latency is measured as a function of path length, that is, the number of intermediary network devices ("hops") in a route. Each hop may contribute to the overall latency of the route, thus a path with a lower hop count is expected to have less latency and few opportunities for forwarding failures. Packet delay variation (i.e., transmission jitter) is variation in latency over time, e.g., where packets arrive in bursts or with inconsistent delay. Transmission errors may cause poor goodput, high latency or lag, and undesirable delay variation. Metrics of transmission error include counts of packet re-transmissions, ratios of packet re-transmissions to first-transmissions, and congestion-related transmissions such as packets with explicit congestion notification ("ECN") flags set.

The network analyzer 188 gathers measurements of network performance using one or more such metrics. In some implementations, the network analyzer sends probes (e.g., Internet Control Message Protocol ("ICMP") packets) through the network 100 and measures for one or more performance metrics. Probes can be useful within a single AS. However, some network devices may be configured to ignore probe packets, or to give them special handling. As a result, measurements of probes may provide limited or misleading information. Accordingly, in some implementations, the network analyzer 188 measures performance of data traffic that is not specifically a probe. In some implementations, the network analyzer gathers measurements of both probe traffic and non-probe traffic.

In some implementations, the network analyzer 188 measures network traffic between the access node 126 and one or more of the host 150, the source cache 152, and the off-site cache 154. In some instances, an access node 126 may participate in data flows with multiple devices in the service network 118 as well as off-site cache(s) 154. The network analyzer 188 can compare measurements of performance for these different flows and contrast them to improve association of the measurements to particular portions of the network.

Figure 2:
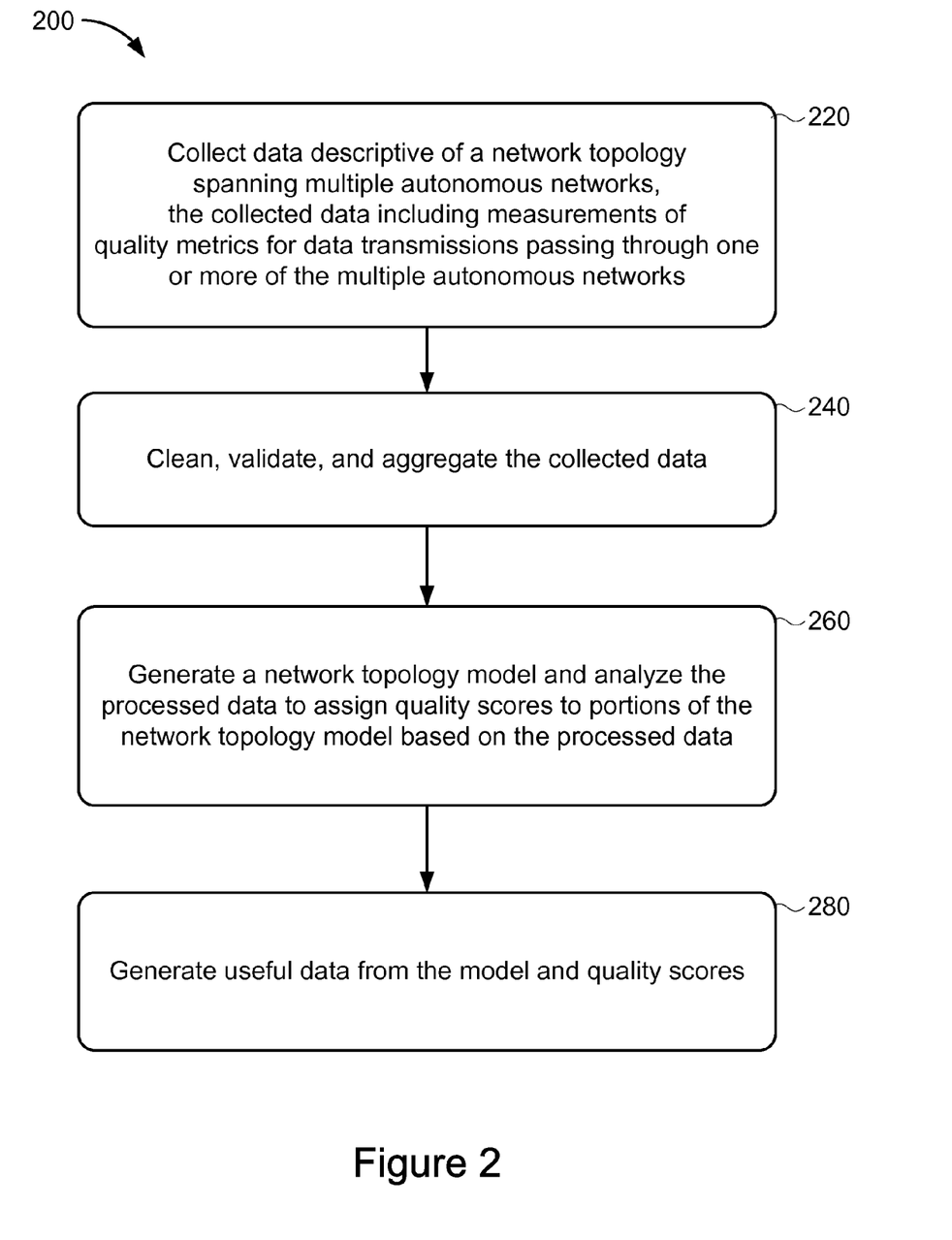
FIG. 2 is a flowchart illustrating a method of network analysis.

FIG. 2 is a flowchart illustrating a method 200 of network analysis. In some implementations, the network analyzer 188 shown in FIG. 1 implements the method 200. In broad overview of the method 200, at stage 220 the network analyzer 188 collects data descriptive of a network topology spanning multiple autonomous networks. The collected data includes measurements of quality metrics for data transmissions passing through one or more of the multiple autonomous networks, and may also include control plane statistics such as counts of and metrics associated with Border Gateway Protocol ("BGP") advertisements received at an edge node 164 or 166. At stage 240 the network analyzer 188 cleans, validates, aggregates, and processes the collected data. This effectively anonymizes the measurements, removes outlier measurements, aggregates data from multiple sources, and processes it into a unified view of network performance. At stage 260 the network analyzer 188 generates a network topology model and analyzes the processed data to assign quality scores to portions of the network topology model based on the processed data. Then, at stage 280 the network analyzer 188 can generate useful data from the model and quality scores. For example, the network analyzer 188 can generate reports, identify preferable routes for the controller 180, or even assist with evaluating potential peering opportunities.

Figure 3:
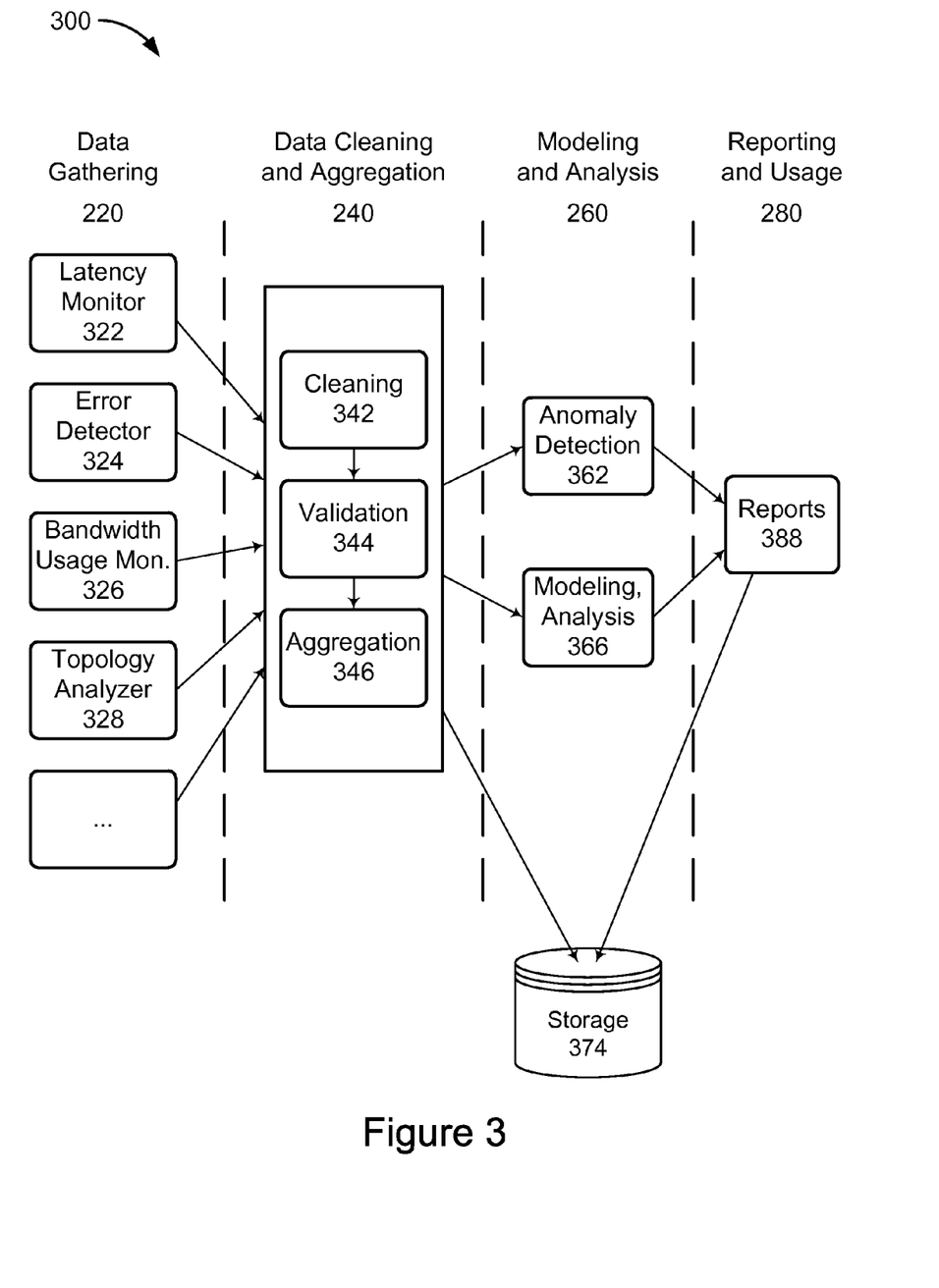
FIG. 3 is a diagram illustrating details of the stages in network analysis.

FIG. 3 is a diagram illustrating details of the stages in the method 200 illustrated in FIG. 2. The following detailed description of FIG. 2 also references FIG. 3. In broad overview of FIG. 3, the network analyzer 188 gathers data from a variety of sources, e.g., network metric monitors. Some non-limiting examples of network metric monitors include a latency monitor 322, an error detector 324, a bandwidth usage monitor 326, a topology analyzer 328, and so forth. The network analyzer 188 gathers data at stage 220 and processes it at stage 240. Processing may include cleaning 342, validating 344, and aggregating 346 the data. The data is recorded to data storage 374. At stage 260, the network analyzer 188 does further anomaly detection 362 and modeling and analysis 366, and at stage 280, network analyzer 188 uses the data, e.g., to generate reports 388 that are also recorded to the storage 374.

Referring to FIG. 2 in more detail, at stage 220 of the method 200, the network analyzer 188 collects data descriptive of a network topology spanning multiple autonomous networks. The collected data includes measurements of quality metrics for data transmissions passing through one or more of the multiple autonomous networks. In some implementations, the collected data includes measurements of quality metrics for control plane statistics such as counts of and metrics associated with Border Gateway Protocol ("BGP") advertisements received at an edge node 164 or 166. Control plane statistics can provide additional information about availability and quality of alternative paths through different autonomous system networks along potential routes. Metrics may include, for example, bandwidth, throughput, goodput, congestion events, congestion frequency, path length (i.e., hop count), round-trip time ("RTT"), latency, lag, packet delay variation, re-transmission events, ratios of packet re-transmissions to first-transmissions, congestion-related transmissions such as packets with explicit congestion notification ("ECN") flags set, BGP advertisement counts and frequencies, and broadcasts of BGP routing information bases ("RIB"). The network analyzer 188 gathers data for these metrics from a variety of network metric monitors. Network metric monitors include, for example, a latency monitor 322, an error detector 324, a bandwidth usage monitor 326, and/or a topology analyzer 328, as shown in FIG. 3. In some implementations, one or more network devices in the network environment 100 are configured to provide measurements to the network analyzer 188. In some implementations, a dedicated network monitor gathers measurements for one or more of the metrics and provides the measurements to the network analyzer 188. In some implementations, the network analyzer 188 itself measures one or more of the metrics. In some implementations, the network analyzer 188 uses secondary or redundant measurement sources.

In some implementations, a latency monitor 322 measures for one or more transit-delay related metrics, such as latency, lag, round-trip time ("RTT"), packet delay variation, or path length (i.e., hop count). In some implementations, the latency monitor 322 sends a probe (e.g., an ICMP packet) towards a target destination (e.g., an access node 126, or an edge node 166 of a third-party network) and measures characteristics of the response. For example, the latency monitor 322 may measure the amount of time that elapses from when the probe is sent until a response is received, which is known as round-trip time ("RTT"). In some implementations, data traffic passes through a network device that is or includes the latency monitor 322. The latency monitor 322 can observe the data traffic passing through the network device and record measurements for one or more metrics of latency. In some implementations, the latency monitor 322 observes data traffic between two network nodes, e.g., a data flow between network nodes other than the latency monitor 322 itself. For example, the data traffic may originate from a host 150 in the service network 118 and be destined for an end node 120 via an access network 112. In some such implementations, the latency monitor 322 observes connection-oriented data traffic and measures latency or round-trip times. Connection-oriented communication protocols usually validate transmission of packets using some form of confirmation, e.g., an acknowledgement packet. The latency monitor 322 observes this traffic and measures the elapsed time between when data is sent and when it is acknowledged or confirmed. Examples of connection-oriented transport-layer protocols include the Transmission Control Protocol ("TCP"), the Stream Control Transmission Protocol ("SCTP"), Datagram Congestion Control Protocol ("DCCP"), Resource Reservation Protocol ("RSVP"), Structured Stream Transport ("SST"), Venturi Transport Protocol ("VTP"), Connection Oriented Transport Protocol ("COTP"), or Xpress Transport Protocol ("XTP"). As contrast, the User Datagram Protocol ("UDP") is not a connection-oriented protocol and the Internet Control Message Protocol ("ICMP") is not a transport-layer protocol. A latency monitor 322 that observes data traffic does not necessarily need to use probes. However, in some implementations, the latency monitor 322 will also use probes as a second set of latency measurements. In some implementations, a portion of the network may have less measurement coverage than other portions of the network, e.g., the portion might be a third-party transmission network that does not include any local network metric monitors. In some such implementations, the network analyzer 188 uses measurements of data flows passing through the non-instrumented network portion to effectively measure characteristics of the network portion. In some implementations, the network analyzer 188 causes probes to be sent, e.g., by the latency monitor 322 or by an end device 120, through the non-instrumented network portion. In some implementations, the network analyzer 188 or network controller 180 causes data traffic to be sent through the non-instrumented network portion. The network analyzer 188 then obtains current measurements based on the characteristics and behavior of the data traffic passing through the non-instrumented network portion.

In some implementations, the latency monitor 322 measures latency by monitoring one or more TCP flows. A TCP sender assigns a sequence number to each packet in a TCP flow, and the corresponding TCP receiver responds with acknowledgement of the sequence numbers received. The latency monitor 322 can measure the amount of time that elapses between when a TCP packet is sent, and when the recipient acknowledges receipt, e.g., using a state machine. In some implementations of the TCP protocol, the receiver acknowledges packets in groups (that is, the sender may transmit several packets, each with its own sequence number, and the receiver might send a single acknowledgement indicating receipt of the several packets). Accordingly, the elapsed time between transmission of the first packet in the group and receipt of the collective acknowledgement will be longer than the elapsed time between transmission of the last packet in the group and receipt of the collective acknowledgement. In some implementations, the latency monitor 322, or the network analyzer 188, addresses this imprecision by only using latency measurements associated with the last packet sent that is confirmed by the collective acknowledgment. In some implementations, the latency monitor 322, or the network analyzer 188, addresses this imprecision by measuring latency over a large number of packets and calculating a statistical approximation of the actual latency, e.g., as an arithmetic mean (average) of the measured latency. In some implementations, latency is measured over a time interval with a particular size. The size of the time interval can vary between different monitors and for different network portions. In some implementations, the size of the time interval varies over time. For example, shorter intervals may be used during periods of high network use and longer intervals may be used when network use has lessened. In some implementations, latency measurements are tagged or otherwise associated with a measurement time or measurement interval. For example, in some implementations, the latency monitor 322 begins a measurement interval at a first time T1, identifies one or more packets in transit towards a destination (e.g., as part of a packet flow such as a TCP flow or SCTP flow), identifies one or more responses to the identified packets, determines the time elapsed between the identified transit towards the destination and the corresponding response, and aggregates the elapsed times for a plurality of transit/response pairs occurring before a measurement interval end time T2. The aggregated elapsed time is a measure of latency for the time interval beginning at T1 and ending at T2. In some implementations, the aggregation is a mean average of elapsed times. In some implementations, the aggregation is a median elapsed time. In some implementations, the aggregation is a mean average of a subset of the elapsed times, where the subset is constructed by eliminating one or more outlier values. In some implementations, the time interval latency measurement is structured as a data triple, e.g., begin time (T1), end time (T2) or interval span (T2-T1), and latency measurement (i.e., the aggregated elapsed time). The data triple can be recorded, for example, as {T1, T2, Latency}. In some implementations, the measurement is structured as a data quad-tuple, e.g., begin time (T1), end time (T2) or interval span (T2-T1), latency measurement (i.e., the aggregated elapsed time), and an identifier for, or associated with, the common destination of the measured packet flows. The data quad-tuple can be recorded, for example, as {T1, T2-T1, Latency, Destination Id}. The common destination may be identified as an IP address, a block of IP addresses (e.g., using classless inter-domain routing ("CIDR") notation), an Autonomous System Number ("ASN"), or as any other identifier for the common destination.

In some implementations, two or more participant devices may have synchronized clocks, e.g., clock synchronized using the network time protocol ("NTP"). For example, the source cache 152 in the service network 118 may synchronize with the off-site cache 154 in a third-party transmission network 114. When devices are synchronized, the latency monitor 322 can measure latency by examining any timestamp information embedded in the network traffic between the synchronized devices and calculate the amount of time that has elapsed since a time-stamped packet was sent.

In some implementations, a latency monitor 322 measures for packet delay variation, which is a measure of how much latency fluctuates over time, a.k.a., transmission jitter. A route that has low latency a significant portion of the time, but is prone to short periods of high latency may have an overall low average latency yet still be undesirable for latency sensitive traffic. An alternative route that has a slightly higher average latency that is more consistent may be more desirable for latency sensitive traffic. In some implementations, the network analyzer 188 calculates packet delay variation from periodic latency measurements reported by the latency monitor 322. In some implementations, the latency monitor 322 adjusts the precision of latency measurements during periods of high transmission jitter. For example, in some implementations, the size of a time interval used in measuring latency is a function of the packet delay variation.

In some implementations, an error detector 324 maintains statistics of error events. For example, the error detector may monitor data flows and identify incidents where a packet is lost. A request for a packet to be resent, or the transmission of a duplicate packet, are good evidence that a packet was lost. Lost packets are particularly burdensome for a network because the lost packet consumed network resources but never reached its intended destination. The retransmission is extra work, repetitive of the original transmission of the lost packet. The extra traffic can waste bandwidth and contribute to network congestion with no value to the communication itself. Error measurements aide in calculating goodput, which is the throughput of information content exclusive of other traffic such as network configuration data, protocol control information, or repeated transmission of lost packets. That is, goodput is a measure of the actual payload data successfully transmitted. All other network usage is effectively an overhead cost of transmitting that data. Some routes between the service network 118 and the access network 112 may pass through transmission networks 114 that charge fees for transit. In some implementations, the network analyzer 188 calculates a payload-transmission cost as a function of goodput across a particular transmission network and the monetary cost of transmission across the particular transmission network.

In some implementations, a bandwidth usage monitor 326 measures for bandwidth usage, that is, throughput, and goodput. Bandwidth usage can be measured at any network node, e.g., network devices 160 in the service network 118. Network nodes at the edge of an Autonomous System network, e.g., edge nodes 164, can measure the throughput as the amount of data being transmitted to a neighboring network, e.g., a transmission network 114. In some implementations, the bandwidth monitor 326 collects load information from one or more edge nodes 164 to obtain throughput information. In some implementations, the network analyzer 188 periodically samples data flows passing through one or more network nodes to estimate load volume. The maximum measured throughput is effectively a measure of the available bandwidth on that network. In some implementations, the network analyzer 188 compares the maximum measured throughput to an advertised or expected bandwidth for a particular route. In some implementations, the network analyzer 188 may determine that a route is underutilized based on a low maximum throughput as compared to an expected bandwidth availability. In some implementations, the network analyzer 188 may determine that a route is congested or experiencing failure based on a drop in measured throughput.

In some implementations, a topology analyzer 328 looks up routes to network nodes, which can then be used to construct a model of the network. In some implementations, the topology analyzer 328 uses traceroute packets to determine routes. In some implementations, the topology analyzer 328 participates in a route-broadcasting protocol such as the Border Gateway Protocol ("BGP"). The topology analyzer 328 can learn about routes advertised by such protocols. In some implementations, the topology analyzer 328 obtains BGP information from multiple BGP-participant network devices. In some implementations, the topology analyzer 328 obtains active routing information base ("RIB") data from one or more network devices. In some implementations, the topology analyzer 328 is assisted by remote applications that run traceroute routines from disparate network vantage points. For example, the off-site cache 154 may be configured to run traceroutes towards the service network 118 and report the routes to the topology analyzer 328. Because some network devices will only respond to traceroute packets originating within the same Autonomous System, the trace performed by the off-site cache 154 within the transmission network 114 may have different results than a trace run from within the service network 118. In some implementations, end devices 120 may similarly perform a traceroute towards the service network 118 and report the routes to the topology analyzer 328. In some implementations, the off-site cache 154 may perform a traceroute towards the access node 126. Each traceroute provides perspective information, which is then forwarded to the topology analyzer 328. In some implementations, the topology analyzer 328 uses a database of network address blocks associated with geographic location information to associate network addresses with geographic locations. In some implementations, the topology analyzer 328 uses the geographic location to validate other network topology information.

In some implementations, the topology analyzer 328 generates a network model. In some such implementations, the topology analyzer 328 constructs a network graph data set, where graph nodes in the data set each represent a respective autonomous system and graph links in the data set each represent connectivity or peering between two autonomous systems. One graph node is a service node representative of the service network 118. The topology analyzer 328 identifies graph links to the service node and annotates each peer node with measured characteristics and geographic location, if available. The graph data set is then augmented working outward from the service node. If a measurement base (such as an off-site cache 154) is present in an autonomous system other than the service network 118, then the topology analyzer 328 will use information from the measurement base to annotate and augment the graph data set from the graph node representative of the respective autonomous system hosting the measurement base.

In some implementations, multiple latency monitors 322, error detectors 324, bandwidth usage monitors 326, and/or a topology analyzers 328, are distributed throughout the network environment 100. For example, they may be situated in different locations within the service network 118. In some implementations, users of end devices 120 may agree to install software that collects measurements at the end devices 120. In some implementations, third-party transmission networks 114 may include latency monitors 322, error detectors 324, bandwidth usage monitors 326, and/or a topology analyzers 328. For example, the off-site cache 154 shown in FIG. 1 may incorporate network performance measurement modules. Referring to FIG. 3, each latency monitor 322, error detector 324, bandwidth usage monitor 326, and topology analyzer 328 reports data to the network analyzer 188 at stage 220.

At stage 240 the network analyzer 188 processes the gathered data. Processing may include cleaning 342, validating 344, and aggregating 346 the data. The data is recorded to data storage 374. This effectively anonymizes the measurements, removes outlier measurements, and aggregates data from multiple sources or network metric monitors into a unified view of network performance. The data collected at stage 220, and processed in stage 240, is recorded to storage 374.

Suitable data storage devices for storage 374 include volatile or non-volatile storage, network attached storage, and storage area networks. A data storage device may incorporate one or more mass storage devices, which may be co-located or distributed. Devices suitable for storing data include semiconductor memory devices such as EPROM, EEPROM, SDRAM, and Flash memory devices. Devices suitable for storing data include magnetic disks, e.g., internal hard disks or removable disks, magneto optical disks, and CD ROM, DVD-ROM, and Blu-Ray® disc drives. Data storage devices may be virtualized. Data storage devices may be accessed via an intermediary server and/or via a network. Data storage devices may structure data as a collection of files, data blocks, or chunks. Data storage devices may provide for error recovery using, for example, redundant storage and/or error recovery data (e.g., parity bits). The storage 374 may host a database, e.g., a relational database. In some implementations, data is recorded as entries in one or more database tables in a database stored in data storage 374. In some such implementations, the data is accessed using a query language such as SQL. The storage 374 may host a file storage system. Data may be stored structured as a knowledge base. Data may be stored in an encrypted form. Access to stored data may be restricted by one or more authentication systems.

Referring still to stage 240, the network analyzer 188 cleans 342, validates 344, and aggregates 346 the data gathered in stage 220 and recorded to storage 374. Cleaning 342 the data includes converting the data from its respective source format, removing extraneous information, filtering, normalizing, and structuring the data for use in combination with data from other sources. For example, the network analyzer 188 may receive network topology information from multiple topology analyzers 328, which may use different strategies for topology detection. The network analyzer 188 normalizes the information received and combines it to form a more comprehensive network topology model. Likewise, the network analyzer 188 can obtain latency and packet delay variation information from multiple types of network metric monitors such as latency monitors 322, error detectors 324, and bandwidth usage monitors 326. The network analyzer 188 normalizes the information received from the different sources and structures it for use in latency analysis.

Validation 344 includes removing statistical outliers. For example, in some implementations, the network analyzer 188 generates a probability distribution function of a particular network characteristic (e.g., latency) and determines if measurements for a route include anomalous results that should be discarded as outliers. In some implementations, the network analyzer 188 clusters measurements and removes measurements that do not have a sufficiently high likelihood of belonging to a particular cluster, e.g., because the measurement is outside some threshold cluster membership requirement. In some implementations, the network analyzer 188 groups measurements into windows of measurement time and identifies the upper and lower quartiles. The network analyzer 188 then calculates validity boundaries based on the inter-quartile range ("IQR") and classifies measurements outside the validity boundaries as outliers. In some implementations, the network analyzer 188 applies a weight or multiplier to measurements such that measurements that are more trustworthy or more likely to be accurate are given more weight than other less reliable measurements. In some implementations, the network analyzer 188 cross-validates measurements across multiple measurement sources or measurement techniques. For example, if the network analyzer 188 has, for a particular route, latency measurements from both probe and non-probe sources, the network analyzer 188 can combine the two data sets and validate the measurements in the combined set. In some implementations, the network analyzer 188 has predictions for expected measurement ranges. Measurements outside the predictions may be invalid. For example, the network analyzer 188 may have information specifying an advertised bandwidth available along a particular route. If the network analyzer 188 receives throughput information that is higher than the advertised bandwidth, which is contradictory to the expectation, then the network analyzer 188 may determine that either the advertised bandwidth information is incorrect or the throughput information is incorrect. In some implementations, the network analyzer 188 validates information against historical trends from previous measurements.

The network analyzer 188 also aggregates data 346. The network analyzer 188 forms a collection of measurements from multiple sources and network vantage points as well as measurements collected using a variety of measurement strategies. The data aggregation 346 also allows the network analyzer 188 to treat entire autonomous systems as a single link for route analysis purposes. That is, even though multiple routes may exist between a transmission network $114_{(a)}$ entry node (e.g., a service network edge node 164) and a transmission network $114_{(a)}$ egress node (e.g., an access network edge node 166), the network analyzer 188 can aggregate all of the measurements for all of the routes through the transmission network $114_{(a)}$ between the entry and egress nodes. The network analyzer 188 can then treat the transmission network 114$_{(a)}$ as a single link between the nodes, with characteristics described by the aggregate measurements. The network analyzer 188 and controller 180 do not necessarily have control over routes through the transmission network 114$_{(a)}$ itself, but can choose whether or not to use the transmission network 114$_{(a)}$. The aggregate data is useful in describing the over-all likely experience of arbitrary data passed through the transmission network 114$_{(a)}$, and thus is useful in deciding whether to use the transmission network 114$_{(a)}$ in a route. In some implementations, the network analyzer 188 groups measurements for network addresses associated with the traffic measured. For example, in some implementations, measurements for all packets with a destination in a particular address range (e.g., a Classless Inter-Domain Routing ("CIDR") address range) are aggregated together.

At stage 260 the network analyzer 188 generates a network topology model and analyzes the processed data to assign one or more quality scores to portions of the network topology model based on the processed data. For example, in some implementations, the network analyzer 188 uses the network graph data set from the topology analyzer 328 as a network model. In some implementations, the network analyzer 188 combines multiple network graph data sets from multiple topology analyzers 328. In some implementations, the network analyzer 188 modifies or refines a network graph data set to include additional information available to the network analyzer 188. In some implementations, the network topology model distinguishes different entry or egress nodes for an autonomous system ("AS") network, e.g., based on geographic location, connectivity characteristics (e.g., is the connection through a third-party exchange or through an AS-controlled multi-homed network device), and so forth. In some implementations, the network topology model includes identifiers (e.g., network address, machine access control ("MAC") address, port numbers, vendor names, AS control entity names, etc.) for each AS entry or egress.

In some implementations, at stage 260, the network analyzer 188 performs further anomaly detection 362 on the aggregated data. Additional cross-validation using the aggregated data may differ from validation of individual measurements or measurement clusters. In some implementations, the network analyzer 188 uses computational models to examine what the aggregate measurements indicate regarding the network. This analysis 366 can include scenario simulations (e.g., identifying the impact of adding load to various routes or of moving load from one route to another). In some implementations, the network analyzer 188 applies hypothetical conditions to the data and analysis 366 allows for identifying how the network would handle the hypothetical conditions. For example, the network analyzer 188 may test for how the network would handle higher traffic loads at various times of the day. In some implementations, the network analyzer 188 extrapolates trends and generates predictions about how the network will look if those trends progress.

The network analyzer 188 can quantify the latency associated with each autonomous system ("AS") network as a whole. To do so, the network analyzer 188 extracts traffic volume passing through each service network edge node 164 for pairs of source node and respective destination AS (e.g., by destination IP address block or subnet). The traffic passes from the service network 118 to a "next network" AS. Based on the network model generated by the topology analyzer 328, the network analyzer 188 identifies paths for the measured traffic and identifies egress points from the next network AS. The network analyzer 188 uses round-trip time measurements for the corresponding paths to the destination IP address block or subnet, and/or to other network addresses in the same geographic location (or metro region). The network analyzer 188 uses this information to predict the AS paths to end devices 120 for the measured traffic and measure latency for the predicted paths. Measurements may be performed at different time granularities for different network blocks (e.g., for different sub-nets, for different AS networks, or different AS segments, i.e., portions of an AS network traversed by a path) along the predicted paths. That is, the length of time in a measurement window for a first AS network along a predicted path may be different from the length of time in a measurement window for a second AS network along the same predicted path.

In some implementations, the network analyzer 188 models a linear relationship between AS paths and latency associated with respective AS networks in the path, or in alternative paths in the same geographic region. The AS path latency is the sum of the latencies for each individual AS network in the path. With sufficient measurements of latency along multiple overlapping AS paths, the network analyzer 188 can construct a linear model or set of linear equations and solve for an estimated latency (or latency range) associated with an individual AS network in the multiple paths. In some implementations, the network analyzer 188 uses least squares, or weighted least squares, to estimate an AS path latency or network segment latency. In some implementations, when a measurement values for a metric is missing for a network segment along a potential path, the network analyzer 188 approximates or estimates a value for the missing measurement value. For example, where a measurement value is missing for latency between two network nodes, the network analyzer 188 uses a value proportional to the geographic distance between the two nodes. A greater geographic distance will naturally have more latency. In some implementations, the value is based on trends for similar networks, e.g., other network nodes separated by a similar geographic distance. In some implementations, when a measurement values for a metric is missing for a network segment along a potential path, the network controller 180 causes some network traffic to be routed through the network segment and the network analyzer 188 obtains measurements from that traffic. In some implementations, the network analyzer 188 uses the measurements and inferences associated with individual network segments to estimate or infer measurement values for network paths through multiple segments. For example, the network analyzer 188 can obtain measurements of metrics for network segments in a path from a host 150 through a transmission network 114$_{(b)}$ to an off-site cache 154 in a transmission network 114$_{(c)}$ as well as measurements of metrics for network segments in a path from the off-site cache 154 to an access node 126 for end devices 120 in an access network 112. The network analyzer 188 then uses measurement values for the segments in these two paths to infer metric values for a path from the host 150 to the access node 126 for end devices 120 via the transmission network 114$_{(b)}$. Measurements and inferences for particular network segments may then be used to make networking decisions for other potential paths traversing the particular network segment. For example, if the network analyzer 188 determines that transmission network 114$_{(b)}$ is congested, data flows from the host 150 to end devices 120 at the access node 126 might be routed through an alternative path such as one passing through transmission network 114$_{(a)}$. In some implementations, the network analyzer 188 uses one or more annotated graphs to identify network segments common to multiple paths. In some implementations, the network analyzer 188 maintains sets of graph data with measurement annotations for one or more network metrics or characteristics.

In some implementations, the network analyzer 188 models routes taken by data flows originating externally to the service network 118, e.g., at an access network 112. For example, an end device 120 may upload data to a host 150 for storage, processing, or sharing. These ingress flows may take multiple different routes depending on how the access network 112 routes them. Traffic from the same access network 112 may arrive at the service network 118 at multiple different edge nodes 164. Network topology discovery data and network measurement data generated at nodes external to the service network 118, e.g., at off-site cache 154 nodes or end device 120 nodes, provides a helpful vantage point for identifying and measuring the routes that externally-originated data flows may take. The external perspective of these external nodes mimics these external sources.

At stage 280 the network analyzer 188 generates useful data from the model and quality scores. For example, the network analyzer 188 can generate reports, identify preferable routes for the controller 180, identify advantageous placement locations for additional off-site cache placements, or even assist with evaluating potential peering opportunities.

In some implementations, the network analyzer 188 compares current measurement and model information with historical measurements and models recorded in storage 374. The comparison may include trends, averages, variations (e.g., calculations of standard deviation), and so forth. In some implementations, if the network analyzer 188 identifies an anomaly, e.g., a sudden spike in latency or drop in throughput, then the network analyzer 188 generates an alarm condition. For example, latency may be higher or lower at particular times of the day due to user behavior patterns (e.g., activity on a network segment in a geographic region may be lower during late night hours when most people in that geographic region are sleeping); if the network analyzer 188 detects higher latency at unexpected times (e.g., late at night), this may be anomalous. The anomaly could indicate a network failure, or may be attributable to some unusual event such as a malicious denial-of-service attack event. In some implementations, the alarm condition is reported to one or more system operators by e-mail, SMS text message, automated telephone call, instant message, and any other available medium for emergency communication.

In some implementations, the network analyzer 188 conducts simulations to predict impact of proposed changes on various traffic flows. In some implementations, the network analyzer 188 conducts simulations to determine if a lower latency paths exist for ingressing and/or egressing traffic, and to identify the lower latency paths that exist. In some implementations, the network analyzer 188 runs simulations to determine whether periodic network conditions coincide with other temporal events. In some implementations, the network analyzer 188 runs simulations to determine whether adding a hypothetical link or peer would improve performance. In some implementations, the network analyzer 188 identifies an anomalous change in performance for an AS network and identifies corresponding changes to the network topology around the AS network. This information is then used to identify whether the anomalous condition is attributable to a change in a peering relationship, an increase (or decrease) in bandwidth utilization of the AS by a local service, or an increase (or decrease) in bandwidth utilization of the AS by a third-party service.

Figure 4:
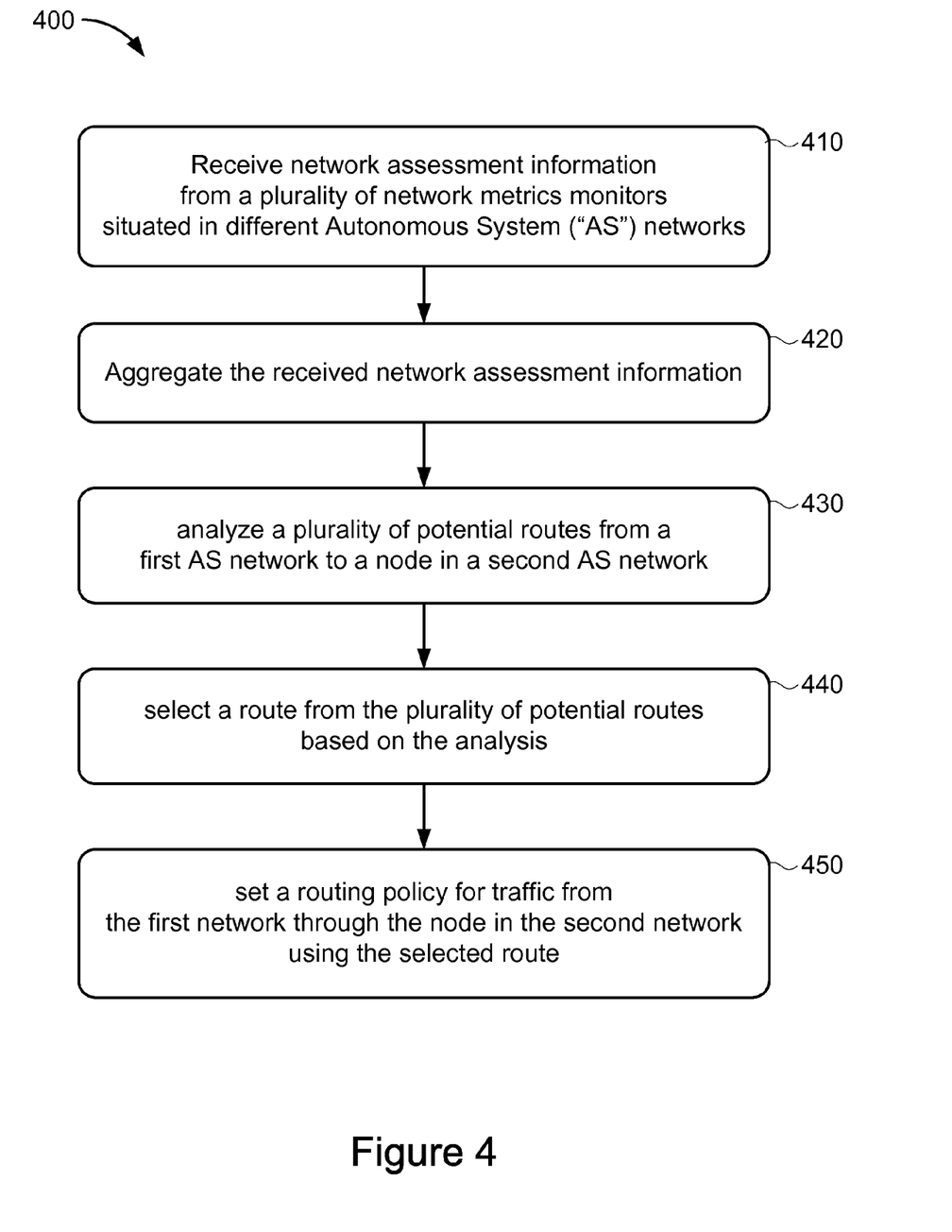
FIG. 4 is a flowchart illustrating an example method for route selection based on network analysis of multiple third-party networks.

FIG. 4 is a flowchart illustrating an example method 400 for route selection based on network analysis of multiple third-party networks. In broad overview of the method 400, at stage 410, a network analyzer 188 receives network assessment information from a plurality of network metric monitors situated in different autonomous system networks. At stage 420, the network analyzer 188 aggregates the received network assessment information. At stage 430, the network analyzer 188 analyzes a plurality of potentials routes from a first autonomous system network to a node in a second autonomous system network. Then, at stage 440, the network analyzer 188 or a network controller 180 selects a route or routes from the plurality of potential routes based on the analysis and, at stage 450, sets a routing policy for traffic from the first network through the node in the second network using the selected route.

Referring to FIG. 4 in more detail, at stage 410 of the method 400, a network analyzer 188 receives network assessment information from a plurality of network metric monitors situated in different autonomous system ("AS") networks, e.g., access network 112 or transmission networks 114. The network analyzer 188 uses this information to identify and characterize routes between a first network and a second network. The routes may include one or more "intermediary" networks in addition to the first and second networks. These intermediary networks may be, for example, access networks 112 or transmission networks 114.

At stage 420, the network analyzer 188 aggregates the received network assessment information as described above in reference to FIG. 3. The network analyzer 188 constructs a network graph data set, where graph nodes in the data set each represent a respective routing domain or autonomous system and graph links in the data set each represent connectivity or peering between two routing domains or autonomous systems. The network analyzer 188 annotates the network graph data with aggregate characteristic measurement information. In some implementations, the annotations include geographic data for an autonomous system, e.g., a jurisdiction or metro-region for the autonomous system network. In some implementations, the annotations include geographic data for nodes, e.g., gateway nodes, in autonomous system, e.g., an address or a latitude and longitude pair for a peering point facility. The annotated data set describes the topology and characteristics of network paths between a first network (e.g., service network 118) and a second network (e.g., access network 112), where the network paths cross one or more intermediary transmission networks 114 controlled by third-parties as autonomous systems.

At stage 430, the network analyzer 188 analyzes a plurality of potentials routes from a first autonomous system network to a node in a second autonomous system network. In some implementations, the network analyzer 188 identifies, based on the aggregated information, one or more routes from the first network to the node in the third network that each satisfies a set of criteria. For example, in some implementations, the criteria is end-to-end latency below a latency threshold and reliability above a reliability threshold. For example, in some implementations, reliability is a function of stability, packet delay variation, and retransmission rates. In some implementations, the network analyzer 188 applies scores to each node in the network graph data set, where the scores represent desirability or monetary cost of sending data through the respective network. Using these scores as weights, the network analyzer 188 identifies the lowest cost path through the graph connecting the first network to a node in the second network. This path represents a desirable path. In some implementations, the network analyzer 188 identifies multiple desirable paths to the node and/or to network devices only reachable through the node. Multiple paths may be used, for example, in equal cost multi-path ("ECMP") or in weighted cost multi-path ("WCMP") routing. In some implementations, the network analyzer 188 generates the scores using traffic-class specific functions. That is, there may be a first score indicating the desirability of a path for a first class of traffic and a second different score indicating the desirability of the path for a second class of traffic. For example, in some implementations, data traffic may be classified as either "latency sensitive" or "delay tolerant." An example of latency sensitive traffic is data traffic for real-time human audio and/or video communication, where perceived lag created by high latency interferes with the usefulness of the communication. An example of delay tolerant traffic is e-mail, where a few extra minutes of transit time is usually unnoticeable by the user. Accordingly, in some such implementations, the network analyzer 188 generates a first score for use with latency sensitive traffic (e.g., the score may emphasize low-latency and goodput as more important than monetary cost) and a second score for use with delay tolerant traffic (e.g., the score may emphasize low monetary cost of transmission as more important than latency or throughput). In some implementations, more than two classes of traffic are used, e.g., some traffic may be tolerant of moderate latency but intolerant of high packet delay variation (e.g., some media streaming), some traffic may be latency insensitive but intolerant to high failure rates (e.g., file transfer can be slow, but every lost packet has to be resent), and some traffic may be latency sensitive but tolerant of moderate failure rates (e.g., some implementations of voice over Internet protocols ("VoIP") can handle the occasional lost or late packet, as long as enough packets arrive quickly enough to generate a reasonable voice sound with minimal perceptible lag). In some implementations, the network analyzer 188 generates respective scores tailored for each traffic class. In some implementations, the network analyzer 188 generates a matrix of scores and traffic classes.

At stage 440, the network analyzer 188 or a network controller 180 selects a route from the plurality of potential routes based on the analysis and, at stage 450, sets a routing policy for traffic from the first network through the node in the second network using the selected route. For example, in some implementations, the network controller 180 causes all traffic to the node to pass through an edge device providing connectivity to the next AS network along the preferred route. In some implementations, the network controller 180 publishes routing tables or RIBs to network devices within the service network 118 to effect the routing policy. In some implementations, the service network 118 is a software-defined network ("SDN") and an SDN flow controller assigns flows to routes through a next-network AS along the preferred route.

FIG. 5 is a block diagram of an example network device 131. The example network device 131 is suitable for use in implementing the intermediary network devices described herein, in accordance with an illustrative implementation. The computing system 141, described below in reference to FIG. 6, may also be suitable as a network device 131. For example, with network function virtualization ("NFV"), some network functionality normally implemented in hardware circuitry is implemented as software executing on a processor (e.g., a general purpose processor). In broad overview, the network device 131 includes a control module 138 and memory 134, e.g., for storing device configuration and routing data. The network device 131 includes a forwarding engine 132 that uses the device configuration and routing data stored in memory 134 to manage data traffic at network interfaces 136. In some implementations, the network device 131 is implemented for use in a software-defined network ("SDN"), where the network device 131 is controlled by an external SDN controller. In some implementations, one or more functional components of the network device 131 are implemented as software components executed by a general-purpose processor.

Referring to FIG. 5, in more detail, the device 131 includes a set of network interfaces 136. Each network interface 136 may be connected by one or more links to one or more external devices, forming a network (e.g., the network 110 shown in FIG. 1). External devices send data packets to the network device 131, via these links, arriving via an ingress interface (e.g., network interface $136_{(a)}$). The network device 131 forwards received data packets to an appropriate next-hop via an egress interface (e.g., network interface $136_{(c)}$). In some implementations, the forwarding engine 132 determines which network interface 136 to use for forwarding each data packet received.

The forwarding engine 132 uses configuration and routing data in memory 134 to manage the data traffic at network interface ports 136. The configuration and routing data in memory 134 are controlled by the control module 138. In some implementations, the forwarding engine 132 updates packet headers before forwarding packets to an egress network interface port 136. For example, the forwarding engine 136 may update ECN, TTL, or checksum information in packet headers. In some implementations, an incoming packet contains routing instruction embedded in a header of the incoming packet and the forwarding engine 132 forwards the packet based on the embedded instructions.

The memory 134 may be any device suitable for storing computer readable data. Examples include, but are not limited to, semiconductor memory devices such as EPROM, EEPROM, SRAM, and flash memory devices. In some implementations, the memory 134 of a network device 131 includes memory dedicated to storing patterns for identifying packet flows, e.g., as ternary content-addressable memory ("TCAM"). In some implementations, the memory 134 of a network device 131 includes memory dedicated to buffering packet flows as they traverse the network device 131. A network device 131 may have any number of memory devices 134.

The control module 138 manages the performance of the network device 131. In some implementations, the control module 138 receives instructions from an external control device. For example, in a software-defined network ("SDN"), the control module 138 may receive control instructions from an SDN controller external to the network device 131. In some implementations, the control module 138 processes route-information packets (i.e., control plane packets) and updates the memory 134 with modifications to routing tables used by the forwarding engine 132. In some implementations, the control module 138 reads data arriving at an egress interface 136 into a buffer stored in memory 134. The control module 138 may be implemented using a general purpose processor or special purpose logic circuitry, e.g., an application specific integrated circuit ("ASIC").

FIG. 6 is a block diagram of an example computing system 141. The example computing system 141 is suitable for use in implementing the computerized components described herein, in accordance with an illustrative implementation. In broad overview, the computing system 141 includes at least one processor 148 for performing actions in accordance with instructions and one or more memory devices 144 or 149 for storing instructions and data. The illustrated example computing system 141 includes one or more processors 148 in communication, via a bus 142, with memory 144, at least one network interface controller 143 with network interface port 146 for connection to a network (not shown), and other components 145, e.g., input/output ("I/O") components 147. Generally, the processor(s) 148 will execute instructions received from memory. The processor(s) 148 illustrated incorporate, or are directly connected to, cache memory 149. In some instances, instructions are read from memory 144 into cache memory 149 and executed by the processor(s) 148 from cache memory 149.

In more detail, the processor(s) 148 may be any logic circuitry that processes instructions, e.g., instructions fetched from the memory 144 or cache 149. In many embodiments, the processor(s) 148 are microprocessor units or special purpose processors. The computing device 141 may be based on any processor, or set of processors, capable of operating as described herein. The processor(s) 148 may be single core or multi-core processor(s). The processor(s) 148 may be multiple distinct processors. In some implementations, the processor(s) 148 are implemented as circuitry on one or more "chips."

The memory 144 may be any device suitable for storing computer readable data. The memory 144 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto-optical disks, and optical discs (e.g., CD ROM, DVD-ROM, or Blu-Ray® discs). A computing system 141 may have any number of memory devices 144.

The cache memory 149 is generally a form of computer memory placed in close proximity to the processor(s) 148 for fast access times. In some implementations, the cache memory 149 is part of, or on the same chip as, the processor(s) 148. In some implementations, there are multiple levels of cache 149, e.g., L2 and L3 cache layers.

The network interface controller 143 manages data exchanges via the network interface 146 (sometimes referred to as a network interface port). The network interface controller 143 handles the physical and data link layers of the OSI model for network communication. In some implementations, some of the network interface controller's tasks are handled by one or more of the processor(s) 148. In some implementations, the network interface controller 143 is incorporated into the processor 148, e.g., as circuitry on the same chip. In some implementations, a computing system 141 has multiple network interfaces 146 controlled by a single controller 143. In some implementations, a computing system 141 has multiple network interface controllers 143. In some implementations, each network interface 146 is a connection point for a physical network link (e.g., a cat-5 Ethernet link). In some implementations, the network interface controller 143 supports wireless network connections and an interface port 146 is a wireless (e.g., radio) receiver/transmitter (e.g., for any of the IEEE 802.11 protocols, near field communication "NFC", Bluetooth, BLE, ANT, or any other wireless protocol). In some implementations, the network interface controller 143 implements one or more network protocols such as Ethernet. Generally, a computing device 141 exchanges data with other computing devices via physical or wireless links through a network interface 146. The network interface 146 may link directly to another device or to another device via an intermediary device, e.g., a network device such as a hub, a bridge, a switch, or a router, connecting the computing device 141 to a data network such as the Internet.

The computing system 141 may include, or provide interfaces for, one or more input or output ("I/O") components 147. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

The other components 145 may include an I/O interface, external serial device ports, and any additional co-processors. For example, a computing system 141 may include an interface (e.g., a universal serial bus ("USB") interface) for connecting input devices, output devices, or additional memory devices (e.g., portable flash drive or external media drive). In some implementations, a computing device 141 includes an additional device 145 such as a co-processor. For example, a math co-processor can assist the processor 148 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A system comprising:
   a plurality of network metric monitors, each network metric monitor comprising a processor configured to:
   obtain measurements for one or more network metrics, and
   transmit network assessment information based on the measurements it obtains to a network analyzer in a first network, the network assessment information transmitted by the respective network metric monitor indicating values for characteristics of one or more network paths from the respective network metric monitor to a node in a second network,
   wherein at least one of the plurality of network metric monitors is situated in a network external to the first network;
   the network analyzer comprising a processor configured to:
   receive the network assessment information from each network metric monitor of the plurality of network metric monitors,
   aggregate the received network assessment information from the plurality of network metric monitors, and
   calculate, based on the aggregated network assessment information, values for a network characteristic of each of a plurality of intermediary networks between the first network and the second network, wherein the network characteristic of each of the plurality of intermediary networks is descriptive of all routes traversing from an entry into the respective intermediary network to an egress of the respective intermediary network,
   a network controller for the first network, the network controller comprising a processor configured to:
   select, based on the aggregated network assessment information and the calculated values for the network characteristic, a route from among a plurality of potential routes that pass through the plurality of intermediary networks from the first network to the node in the second network that satisfies a set of criteria, and
   set routing policy for data flows from the first network through the node in the second network using the selected route.

2. The system of claim 1, wherein at least one network metric monitor of the plurality of network metric monitors is situated in a network node and wherein the processor of the at least one network metric monitor is configured to obtain measurements based on at least one data flow that uses a connection-oriented transport-layer protocol and traverses through, or originates at, the network node.

3. The system of claim 1, wherein the processor of the network controller is further configured to cause one or more network devices to route data flows between a local node in the first network and a client node, through the node in the second network, using the selected route.

4. The system of claim 1, wherein the processor of the network analyzer is further configured to calculate whole route characteristic values for the plurality of potential routes as composite values, each composite value representing a collective characteristic for one of the plurality of potential routes as a whole.

5. The system of claim 4, wherein the processor of the network analyzer is further configured to compare the whole route characteristic values for the plurality of potential routes and to select the route from among the plurality of potential routes based on one or more whole route characteristic values of the selected route.

6. The system of claim 1, wherein the received network assessment information from each network metric monitor of the plurality of network metric monitors includes information identifying an autonomous system and the processor of the network analyzer is configured to aggregate the received network assessment information from the plurality of network metric monitors based on an identified autonomous system.

7. The system of claim 1, wherein the plurality of intermediary networks are distinct autonomous systems.

8. The system of claim 1, wherein the network analyzer is a component of the network controller.

9. A method comprising:
receiving, by a network analyzer comprising at least one processor in a first network, network assessment information from each network metric monitor of a plurality of network metric monitors, the network assessment information received from each respective network metric monitor indicating values for characteristics of one or more network paths from the respective network metric monitor to a node in a second network, wherein at least one network metric monitor is situated in a network external to the first network;
aggregating, by the network analyzer, the received network assessment information from the plurality of network metric monitors;
calculating, by the network analyzer, based on the aggregated network assessment information, values for a network characteristic of a plurality of intermediary networks between the first network and the second network, wherein the network characteristic of each of the plurality of intermediary networks is descriptive of all routes traversing from an entry into the respective intermediary network to an egress of the respective intermediary network;
selecting, based on the aggregated network assessment information and the calculated values for the network characteristic, a route from among a plurality of potential routes that pass through the plurality of intermediary networks from the first network to the node in the second network that satisfies a set of criteria; and
setting a routing policy for data flows from the first network through the node in the second network using the selected route.

10. The method of claim 9, wherein at least one network metric monitor is situated in a network node and a processor of the at least one network metric monitor is configured to obtain measurements based on at least one data flow that uses a connection-oriented transport-layer protocol and traverses through, or originates at, the network node.

11. The method of claim 9, further comprising causing one or more network devices to route data flows between a local node in the first network and a client node, through the node in the second network, using the selected route.

12. The method of claim 9, wherein the received network assessment information from each network metric monitor of the plurality of network metric monitors includes information identifying an autonomous system and the at least one processor of the network analyzer is configured to aggregate the received network assessment information from the plurality of network metric monitors based on an identified autonomous system.

13. The method of claim 9, further comprising:
calculating, by the network analyzer, whole route characteristic values for the plurality of potential routes as composite values, wherein each composite value represents a collective characteristic for one of the plurality of potential routes as a whole;
comparing the whole route characteristic values for the plurality of potential routes; and
selecting the route based on one or more whole route characteristic values of the selected route.

14. A non-transitory computer-readable medium storing instructions that, when executed by a computer processor, cause the computer processor to:
receive network assessment information from each network metric monitor of a plurality of network metric monitors, wherein at least one network metric monitor is situated in a network external to a first network, the network assessment information received from each respective network metric monitor indicating values for characteristics of one or more network paths from the respective network metric monitor to a node in a second network;
aggregate the received network assessment information from the plurality of network metric monitors;
calculate, based on the aggregated network assessment information, values for a network characteristic of a plurality of intermediary networks between the first network and the second network, wherein the network characteristic of each of the plurality of intermediary networks is descriptive of all routes traversing from an entry into the respective intermediary network to an egress of the respective intermediary network;
select, based on the aggregated network assessment information and the calculated values for the network characteristic, a route from among a plurality of potential routes that pass through the plurality of intermediary networks from the first network to the node in the second network that satisfies a set of criteria; and
set a routing policy for data flows from the first network through the node in the second network using the selected route.

15. The medium of claim 14, wherein at least one network metric monitor is situated in a network node and a processor of the at least one network metric monitor is configured to obtain measurements based on at least one data flow that uses a connection-oriented transport-layer protocol and traverses through, or originates at, the network node.

16. The medium of claim 14, the instructions further causing one or more network devices in the first network to route data flows between a local node in the first network and a client node, through the node in the second network, using the selected route.

17. The medium of claim 14, the instructions further causing the computer processor to:
calculate whole route characteristic values for the plurality of potential routes as composite values, wherein each composite value represents a collective characteristic for one of the plurality of potential routes as a whole;
compare the whole route characteristic values for the plurality of potential routes; and
select selecting the route based on one or more whole route characteristic values of the selected route.

* * * * *